United States Patent
Lehr et al.

(10) Patent No.: US 8,102,442 B2
(45) Date of Patent: Jan. 24, 2012

(54) IMAGE SENSOR CIRCUIT

(75) Inventors: Steffen Lehr, Villingen-Schwenningen (DE); Patrick Vogel, Duesseldorf (DE); Petrus Gijsbertus Maria Centen, Goirle (NL); Jeoren Rotte, Breda (NL); Ruud van Ree, Breda (NL); Heinrich Schemmann, Villigen-Schwenningen (DE); Karl-Heinz Schaaf, Villingen-Schwenningen (DE); Sabine Roth, Moenchweiler (DE)

(73) Assignee: Thomson Licensing, Boulogne, Billancourt (FR)

( * ) Notice: Subject to any disclaimer, the term of this patent is extended or adjusted under 35 U.S.C. 154(b) by 451 days.

(21) Appl. No.: 12/227,677

(22) PCT Filed: May 22, 2007

(86) PCT No.: PCT/EP2007/054968
§ 371 (c)(1),
(2), (4) Date: Nov. 24, 2008

(87) PCT Pub. No.: WO2007/135158
PCT Pub. Date: Nov. 29, 2007

(65) Prior Publication Data
US 2009/0237542 A1    Sep. 24, 2009

(30) Foreign Application Priority Data

May 23, 2006    (EP) ..................... 06300510

(51) Int. Cl.
*H04N 5/217*    (2006.01)
*H04N 5/335*    (2006.01)
*H03M 1/00*    (2006.01)

(52) U.S. Cl. ............. 348/241; 348/308; 341/126
(58) Field of Classification Search ........... 348/241, 348/257, 294, 302, 308; 341/126, 159
See application file for complete search history.

(56) References Cited

U.S. PATENT DOCUMENTS

| | | | |
|---|---|---|---|
| 6,115,065 A * | 9/2000 | Yadid-Pecht et al. | 348/308 |
| 6,573,936 B2 * | 6/2003 | Morris et al. | 348/294 |
| 7,570,293 B2 * | 8/2009 | Nakamura | 348/308 |
| 2003/0043089 A1 | 3/2003 | Hanson et al. | |
| 2003/0146991 A1 | 8/2003 | Barna et al. | |
| 2004/0135910 A1 * | 7/2004 | Nam | 348/308 |
| 2005/0174455 A1 | 8/2005 | Elmakias et al. | |
| 2005/0195645 A1 * | 9/2005 | Panicacci et al. | 365/156 |
| 2005/0237406 A1 * | 10/2005 | Kim et al. | 348/308 |
| 2007/0076109 A1 * | 4/2007 | Krymski | 348/300 |

FOREIGN PATENT DOCUMENTS

| | | |
|---|---|---|
| EP | 1549050 | 6/2005 |
| WO | WO 99/46929 | 9/1999 |

OTHER PUBLICATIONS

Search Report Dated Aug. 17, 2007.

* cited by examiner

*Primary Examiner* — Trung Diep
(74) *Attorney, Agent, or Firm* — Jeffrey D. Carter

(57) ABSTRACT

An image sensor circuit comprises a pixel cell array having a plurality of pixel cells arranged along a plurality of column lines, a plurality of readout circuits connected to said column lines, each of which comprises an analog-to-digital converter and a multiplexer for selectively applying an output signal of one of said column lines to said analog-to-digital converter. Between two of said column lines which are connected to a first one of said readout circuits located at a first side of said pixel cell array, there is a column line which is connected to a second one of said readout circuits located at a second side of said pixel cell array opposite to said first side.

10 Claims, 5 Drawing Sheets

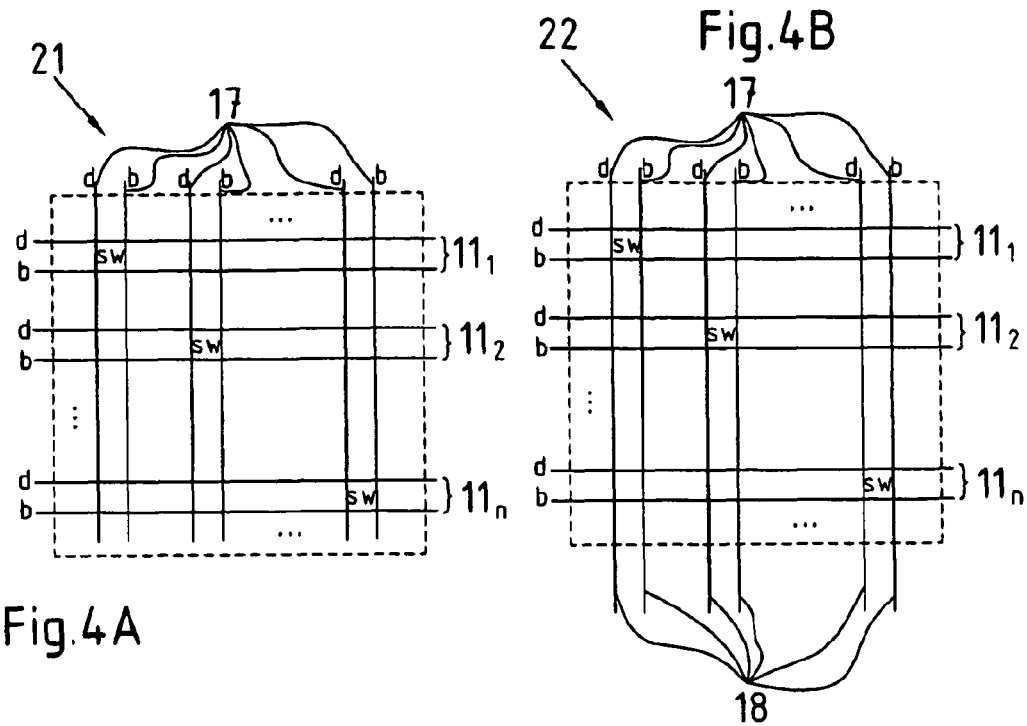
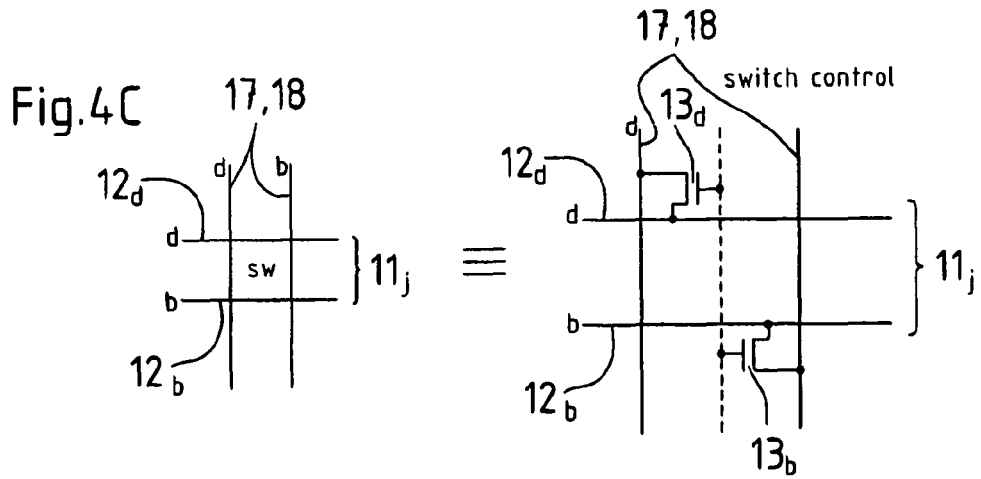

IMAGE SENSOR CIRCUIT

The present invention relates to image sensor circuits, in particular to CMOS image sensor circuits. Such circuits usually comprise a pixel cell array having a plurality of pixel cells arranged along a plurality of column lines, and readout circuitry connected to said column lines and comprising one or more analogue-to-digital converters for converting analogue output signal voltages representative of an amount of light received by one of said pixel cells into digital data.

EP 1 150 494 B1 discloses an image sensor circuit of this type, in which the readout circuitry comprises a multiplexer for selectively applying an output signal from one of the column lines to a common buffer amplifier. For converting the output signal from this buffer amplifier, a single analogue-to-digital converter (ADC) is required. Since there is only one ADC, it can be placed quite freely on a semiconductor substrate, and the size and shape of the area it occupies on the substrate is not subject to severe restrictions. When designing an image sensor circuit according to EP 1 150 494 B1, development costs can be reduced by buying the ADC design off-the shelf from an IP provider. However, the ADC must have a very high bandwidth and therefore tends to be expensive.

On the other hand, WO 99/46851 discloses an image sensor circuit which comprises a pixel cell array having a plurality of pixel cells arranged along a plurality of column lines, and a plurality of readout circuits, each of which is connected to two of said column lines and comprises an analogue-to-digital converter and a multiplexer for selectively applying an output signal of one of said two column lines to the converter. In this circuit, the ADCs may be much slower than the ADC according to the first-mentioned document, but instead there is a problem in that due to scattering of the characteristics of the readout circuits, an image obtained form this sensor circuit may present strip-shaped defects, and the space available for each readout circuit is limited. Specifically, since all readout circuits have to fit along an edge of the pixel cell array, the substrate space occupied by each of these tends to be rather long and narrow. Although the ADCs are simpler and, hence, cheaper in manufacture than that of EP 1 150 494 B1, development costs are high, because an ADC which will fit into the available substrate space cannot be bought off-the-shelf and has to be designed specifically.

The object of the present invention is to provide an image sensor circuit which combines the advantages of the above mentioned prior art designs while avoiding their drawbacks.

This object is achieved by an image sensor circuit comprising a pixel cell array having a plurality of pixel cells arranged along a plurality of column lines, a plurality of readout circuits connected to said column lines, each of which comprises an analogue-to-digital converter and a multiplexer for selectively applying an output signal of one of said column lines to said analogue-to-digital converter, the circuit being characterized in that between two of said column lines connected to a first one of said readout circuits located at a first side of said pixel cell array, there is a column line which is connected to a second one of said readout circuits located at a second side of said pixel cell array opposite to said first side. By splitting the readout circuitry in this way, space constraints are relieved.

If between any two columns connected to two adjacent inputs of said first readout circuit there is a column line connected to the second readout circuit, i.e. if column lines are associated alternately to the two readout circuits, the space available for the readout circuitry components associated to any given column line is practically doubled.

Preferably, each readout circuit comprises a plurality of bus bars, each bus bar having a subset of said column lines associated to it by switches located at intersections of the bus bar and of said associated column lines for selectively opening and closing an electrical connection between one of said associated column lines and said bus bar, wherein no two adjacent column lines are associated to a same bus bar.

The readout circuit further preferably comprises a plurality of amplifiers having an input connected to an associated one of said bus bars, and a multiplexer having inputs connected to outputs of said amplifiers. Using said bus bars, the amplifiers can be placed far apart from the pixel cell array, so that heat dissipated by the amplifiers does substantially not reach the pixel cell array. By keeping the pixel cell array cool, noise is reduced, and the image quality is improved.

In an such an image sensor, if the number of bus bars is n, it is preferred that among any n adjacent inputs of one of said readout circuits, there is one connected to each of said n bus bars. In this way, the column lines associated to a given bus bar are distributed all over the pixel cell array.

Each column line preferably extends across all of said bus bars in order to make the parasitic capacitance resulting from these crossings the same for all column lines and all bus bars.

Similarly, it is preferred that each amplifier is connected to its associated bus bar by a line extending across all of said bus bars.

It is further preferred that each column line has associated to it two storage capacitors and a switch for selectively connecting one of said two capacitors to said column line, and each bus bar comprises a first line for connecting to the first capacitor and a second line for connecting to the second capacitor.

By connecting the first and second lines of each bus bar to inputs of a differential amplifier, a difference between sampled voltages and said two capacitors can be formed prior to AD conversion, whereby the amount of samples to be AD converted is reduced.

In order to reduce parasitic capacities, in said readout circuit each column line is formed of a planar conductor defining a first plane and is shielded by at least one grounded conductor which extends along said planar conductor in said first plane or in a second plane parallel to that first plane.

Similarly, each bus bar may comprise a planar conductor defining a second plane and may be shielded by at least one grounded conductor which extends along said planar conductor in said second plane or in a plane parallel to said second plane.

Further features and advantages of the invention will become apparent from the subsequent description of embodiments thereof referring to the appended drawings.

Figure 5:
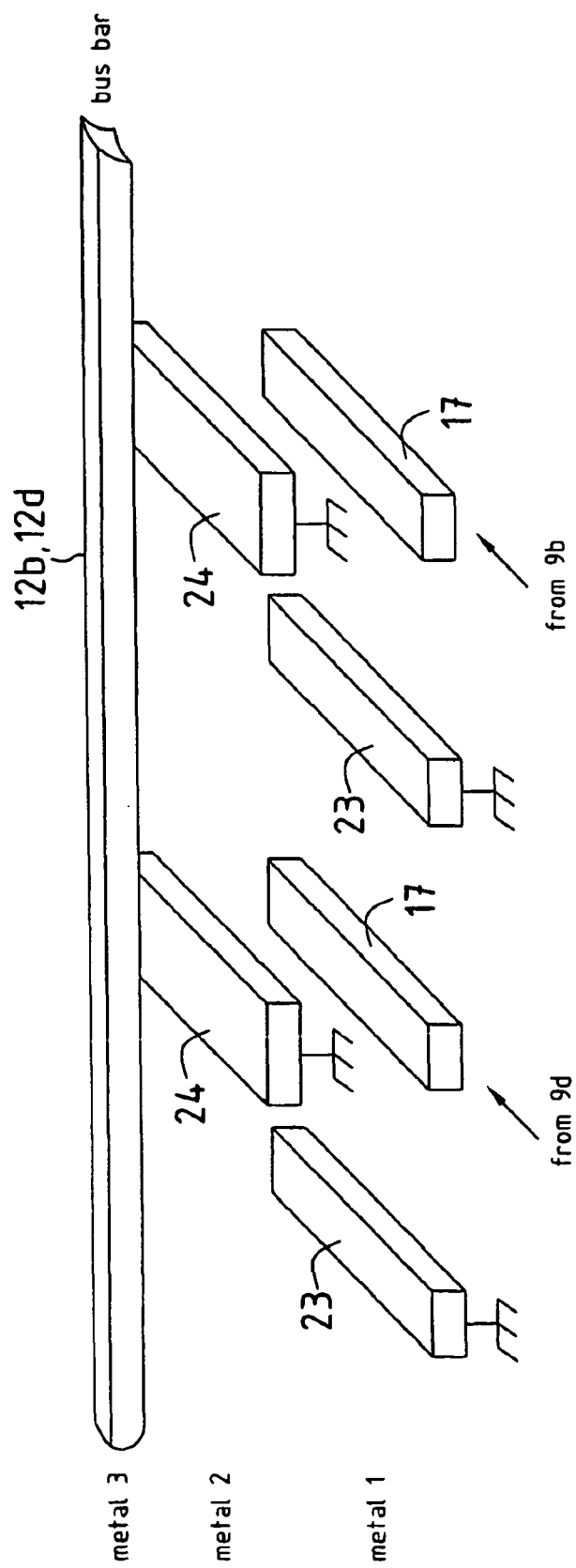
Figure 6:
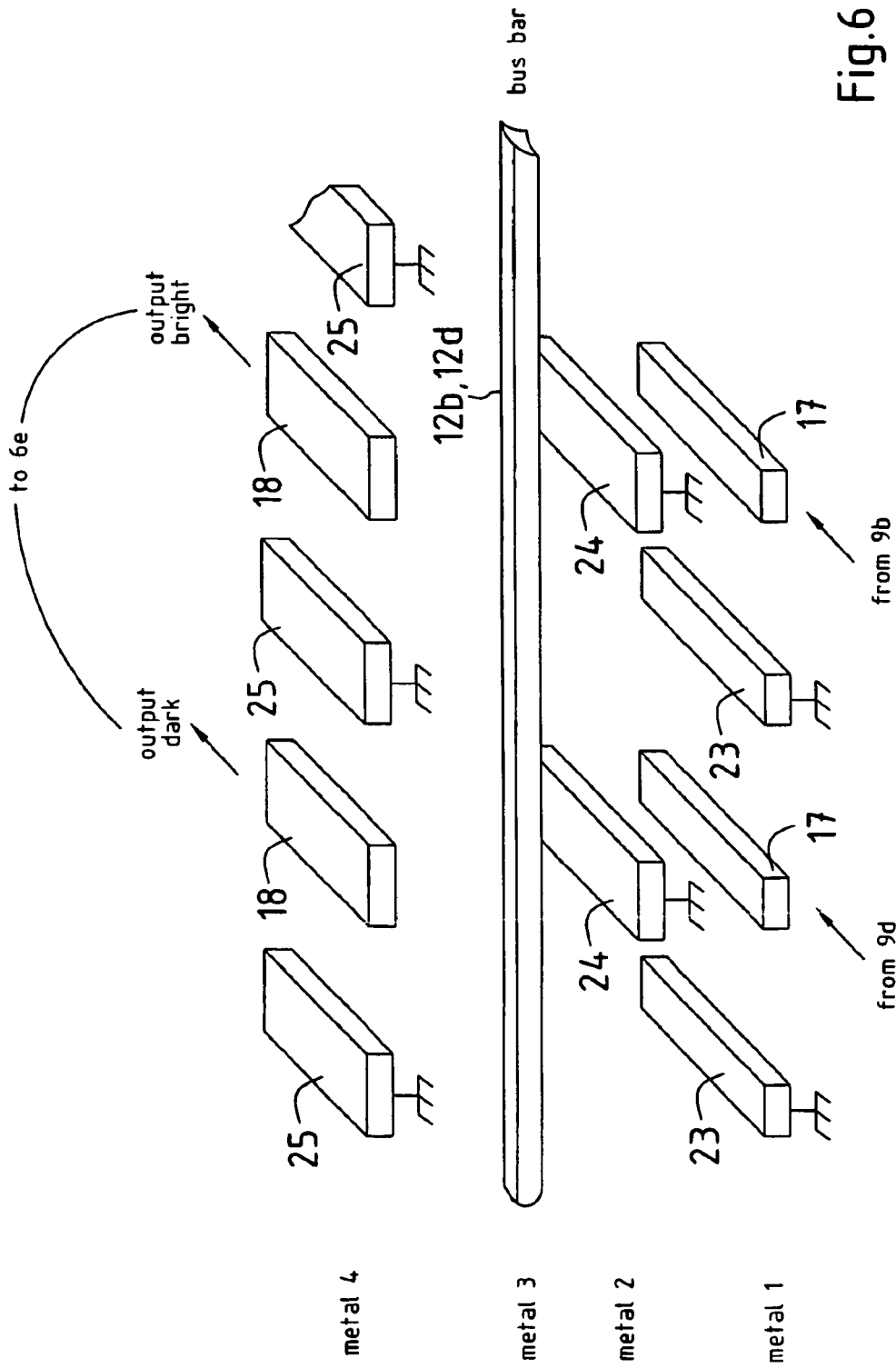

FIG. 4A, B are diagrams of bus bar fields;

FIG. 4C illustrates the structure of a switch in the bus bar fields of FIG. 4a, b;

FIG. 5 is a schematic perspective view of an intersection of conductors in the bus bar field of FIG. 4A; and FIG. 6 is a view analogous to that of FIG. 5 of an intersection of conductors in the bus bar field of FIG. 4B.

Figure 1:
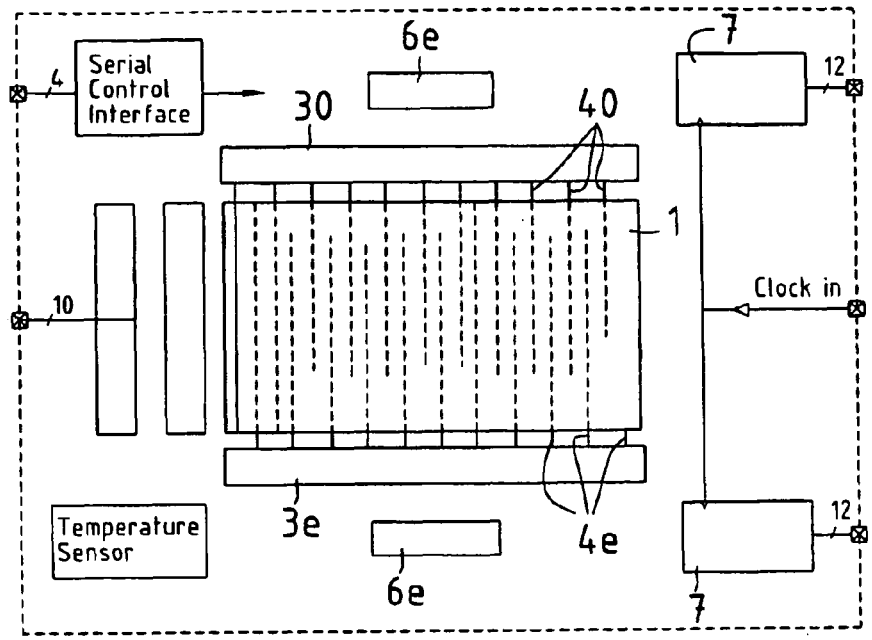
FIG. 1 is a schematic diagram illustrating the localization of components of an image sensor circuit according to the present invention on a circuit substrate.

FIG. 1 schematically illustrates the layout of an image sensor circuit according to the present invention. In the center of a semiconductor chip, there is a pixel array 1 comprising a large number of sensor pixels arranged in a pattern of rows and columns. The sensor pixels may be of any known type. They may e.g. be formed of conventional three-transistor circuits, which means that the sensor pixel itself has no storage capability. However, the architecture is not limited to this kind of pixels. It can be extended to pixels with larger numbers of transistors, which have storage associated to them and/or are capable of performing a global shutter operation. The size of the pixel array 1 is very large for HDTV applications, e.g. 1920×1080 pixels, which results in about 2 million pixels in total. This means that the pixel array diagonal on the chip is easily reaching 10 mm or more, depending on the size of the individual pixels. This makes inter-pixel matching or alignment a major issue for imager design.

A vertical scanning circuit 2 provides signals for selecting pixels of array 1 for reset or readout row by row. All pixels in a same row of the array 1 have their outputs connected to a same column line. There are odd-numbered column lines 4o and even-numbered column lines 4e. According to the invention the circuitry for reading out the pixel array 1 has been divided into two blocks. One block is provided for reading out the even column lines 4e, the other block is provided for reading out the odd column lines 4o. Both readout blocks are identical, one is placed in the layout on top of the pixel array 1, the other, at the bottom of it. Readout blocks include: column readout circuits 3o, 3e comprising a sampling storage block, bus bars and a bus bar multiplexer, an amplification/offset compensation block 6o, 6e comprising a plurality of amplifiers, an ADC multiplexer and a buffer, and an ADC 7.

Figure 2:
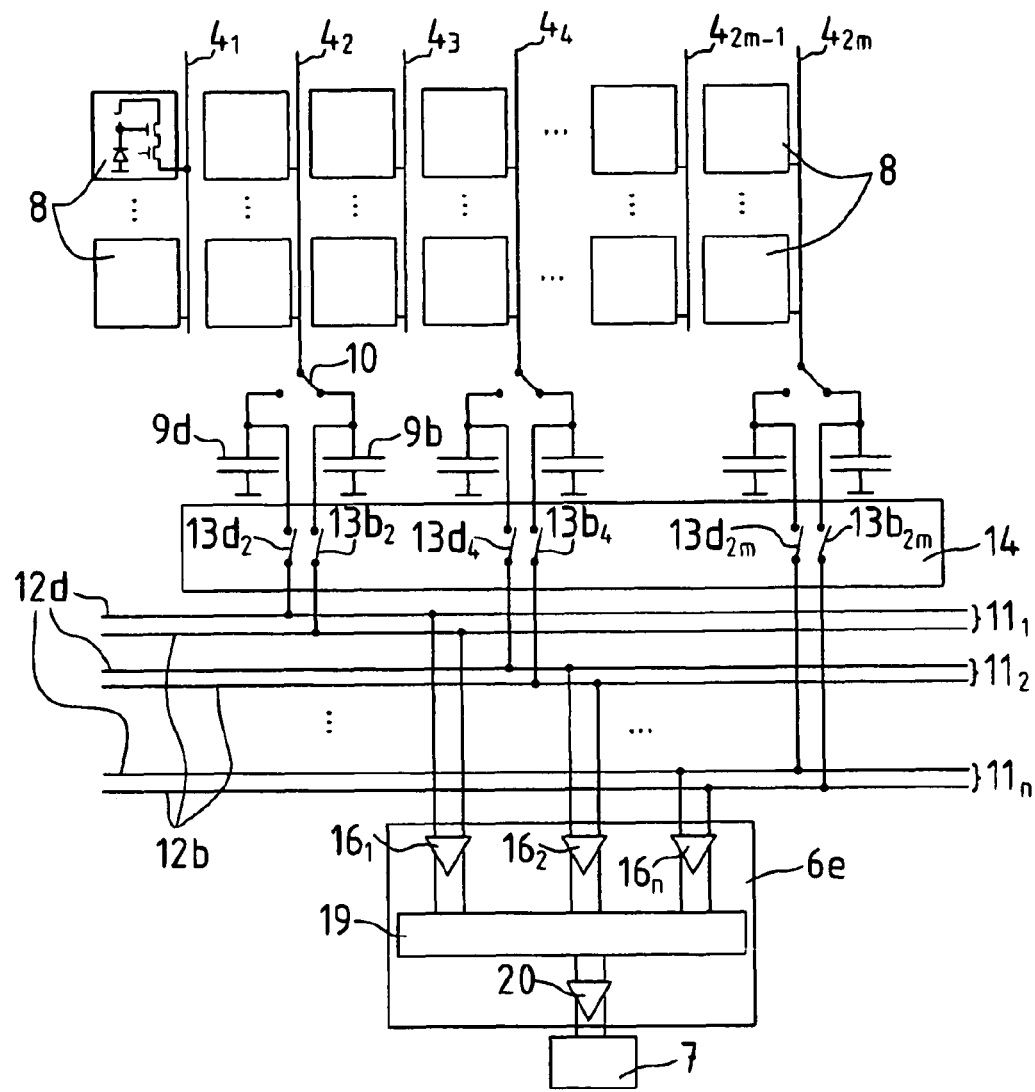
FIG. 2 illustrates a detail of the circuit layout of FIG. 1.

FIG. 2 illustrates in more detail a section of the pixel array 1 and of the readout circuitry. The readout circuitry is illustrated for even-numbered column lines only, the readout circuitry for the odd-numbered lines is a specular image of that for the even-numbered lines and need not be specifically described. FIG. 2 shows twelve pixels 8 of pixel array 1 arranged in two rows and six columns. The pixels 8 have their outputs connected to odd column lines $4_1, 4_3, \ldots, 4_{2m-1}$ and even column lines $4_2, 4_4, \ldots, 4_{2m}$, respectively, 2m being the total number of column lines in pixel array 1.

Two storage capacitors 9d, 9b are connected to the end of each column line by a switch 10 near the border of pixel array 1. When the pixel array 1 is readout row by row under control of the vertical scanning circuit 2, the output voltage levels of dark pixels and of illuminated pixels alternate all the column lines. By means of the switch 10, an output voltage from a dark pixel is sampled and stored in storage capacitor 9d, whereas that of an illuminated pixel in an adjacent row is stored in capacitor 9b.

n parallel bus bars $11_1, 11_2, \ldots, 11_n$ are provided for extracting the signals stored in the capacitors 9d, 9b. Each bus bar comprises two lines 12d, 12b. Line 12b of bus bar $11_j$, j=1, 2, ..., n, is connected to the storage capacitors 9b of column lines $4_{2j}, 4_{2(n+j)}, 4_{2(2n+j)}, \ldots, 4_{2((r-1)n+j)}$, r=m/n by associated switches $13b_{2j}, 12b_{2(n+j)}, 13b_{2(2n+j)}, \ldots, 13b_{2((r-1)n+j)}$. Similarly, bus bar line 12d is connected to the storage capacitors 9d of column lines $4_{2j}, 4_{2(n+j)}, 4_{2(4n+j)}, \ldots, 4_{2((r-1)n+j)}$ by associated switches $13d_{2j}, 13d_{2(n+j)}, 13d_{2(2n+j)}, \ldots, 13d_{2((r-1)n+j)}$. The assembly of switches 13 is referred to as a bus bar multiplexer 14.

The amplification/offset compensation block 6e comprises n switch capacitor amplifiers $16_j$, j=1, ..., n, each of which is associated to one bus bar $11_j$ and has two inputs connected to its lines 12d, 12b, an ADC multiplexer 19 having its inputs connected to the outputs of switch capacitor amplifiers $16_j$, and a buffer 20, the output of which is connected to ADC 7

The amplification/offset compensation block 6e is the first active circuitry in the readout path. In principle, the passive structure formed of bus bar multiplexer 14 and bus bars 11 has a drawback in that the amplitude of the output signals from the pixels is reduced due to charge distribution effects in the bus bars 11. Charge distribution effects have an influence on the gain of the switch capacitor amplifiers $16_j$. namely, this gain is given by:

$$\text{Gain}=C\_storage/(C\_storage+C\_parasitic+C\_ampin),$$

wherein

C_storage is the capacity of a storage capacitor 9b, 9d,

C_parasitic is the parasitic capacity due to conductors such as busbar lines 12d, 12b and to busbar multiplexer switches 13, and C_ampin is the input capacitance of amplifier $16_j$. It is desirable to make C_storage as large as possible and C_parasitic as small as possible. Since the readout circuitry at each side of the pixel array 1 is only connected to one of every two column lines, sufficient space for the storage capacitors is available. Therefore, the capacity of the storage capacitors 9b, 9d can be made large with respect to the parasitic capacitance of the bus bar $11_j$ to which they are connected, of the multiplexer switches 12 and the input capacitance of switch capacitor amplifiers $15_j$. C_storage is practically limited only by the driving capacity of each pixel 8 and by the time available for charging and discharging the storage capacitors, i.e. by the frame rate.

Figure 3:
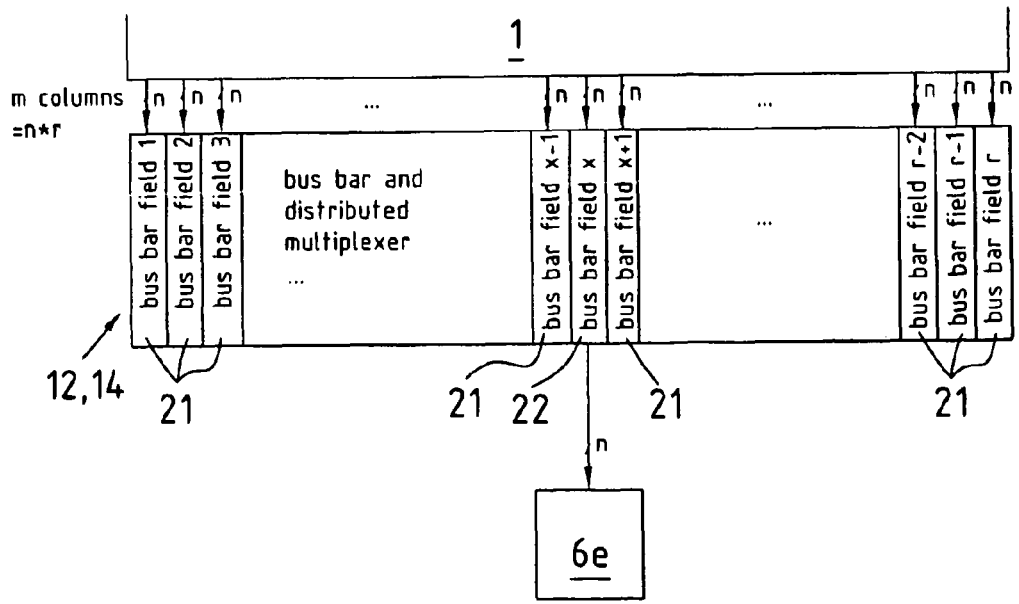
FIG. 3 illustrates the overall structure of the bus bars of the circuit of FIG. 1.

Since the length of each bus bar $12_j$ can be as long as the x axis dimension of the pixel array 1, special care has to be taken to minimize the parasitic capacitance of each bus bar $12_j$, of conductor lines 17 extending between the storage capacitors 9b, 9d and bus bars 11 and of conductor lines 18 extending form the bus bars $12_j$ to the amplification/offset compensation block 6e. One way to minimize this parasitic capacitance is to enlarge the pitch of the bus bar lines 12b, 12d. Other measures will be discussed in detail later referring to FIGS. 3 and 6.

The block 6e has three main tasks, namely to amplify the pixel signals such that they optimally fit into the ADC 7 input range, secondly to drive the ADC input load with sufficient bandwidth to resolve sharp image contrasts, and, thirdly to avoid ADC kickback noise and contribute as little as possible to noise. In order to satisfy these requirements, the block 6e is divided into stages as described above. The parallel amplifiers $16_j$ may have rather low bandwidth and can therefore achieve low noise levels. They provide the required amplification. The buffer 20 in front of the ADC 7 is responsible for the high speed demands. It is essential that the matching of the parallel amplifiers $16_j$ be perfect. This is why switch capacitor amplifiers with automatic offset compensation are preferably used as amplifiers $16_j$. An offset of the buffer 20 is not included in the switch capacitor offset compensation. But this is not a problem, because it can be compensated by calibration on external pins or filtered out in digital signal processing, because there are only two buffers 20, one associated to the odd column lines 4o, the other associated to the even column lines 4e, which have to be adjusted to each other. The fast multiplexer 19 is responsible for combining the parallel outputs from the amplifiers $16_j$ into a single input signal for the ADC 7.

Although FIG. 2 shows only one ADC 7 associated to the even column lines, it is obvious that two or more ADCs 7 (and multiplexers 19, buffers 20) may be provided, each of which handles part of the output signals from the amplifiers $15_j$. The multiplex transition from one amplifier output to the next is preferably as fast as the clocking speed of the ADC.

The bus bar array may be regarded as formed of r=m/n bus bar fields 21, 22, each field being associated to n adjacent even (or odd) column lines 4e (4o). There are two different kinds of bus bar fields, a regular one 21 in which conductor lines 17 coming from the storage capacitors intersect the bus bars 11, and a readout bus bar field 22, which comprises conductor lines 18 extending from the bus bar to the amplification/offset compensation block 6e. The readout bus bar field 22 is preferably located in the middle of the bus bars, because this results in lowest time constants and lowest time constant mismatches.

The design of the bus bar fields 21, 22 is shown in FIGS. 4A to 4C. FIG. 4A shows a regular bus bar field 21, FIG. 4B the readout bus bar field 22, and FIG. 4C illustrates the structure of an intersection between a bus bar 11 and conductor lines 17, 18. In FIGS. 4a and b, "sw" denotes a pair of multiplexer switches $13d_j$, $13b_j$, as illustrated in FIG. 4C, for establishing contact between bus bar lines 12b, 12d and conductor lines 17 or 18. The notation "d" and "b" means dark and bright and corresponds to the two storage capacitors 9d, 9b per column line 4e (4o). It should be noted that in the regular bus bar field 21, all conductor lines 17 extend across all bus bars 11, so that the number of intersections is the same for every bus bar $11_1$ to $11_n$. Accordingly, the parasitic capacitance C_parasitic is the same for all bus bars $12_j$, j=1, 2, . . . , n. The multiplexer switches $13d_j$, $13b_j$ are placed exactly at the location where the conductor lines 17 from the storage capacitors cross the bus bars. This eliminates all parasitic wire capacitances of the wire connections from bus bar connection point and multiplexer switch.

FIGS. 5 and 6 show details of an intersection of the regular bus bar field 21 and the readout bus bar field 22, respectively, in perspective views.

In the regular bus bar field 21 of FIG. 5, the conductor lines 17 from the storage capacitors 9b, 9d are routed in the metal-1 layer surrounded by grounded metal-1 wires 23 to avoid horizontal cross coupling. Vertical cross coupling is avoided by shielding the conductor lines 17 by a In grounded metal-2 conductor 24 on top of lines 17. The metal-3 layer is reserved for lines 12d, 12b of the bus bars 11.

Each bus bar line 12b, 12d is surrounded by grounded metal-3 layer wires, not shown, to avoid cross coupling.

FIG. 6 shows the layout of the readout bus bar field 22. It is identical to the regular bus bar field 21 in the metal layers 1 to 3. The conductor lines 18 are realized in metal-4 layer. Also here the output signals are shielded by grounded metal-4-layer wires. It is important that the conductor lines 16 from the storage capacitors 9b, 9d provide exactly the same coupling in the regular bus bar field 21 as in readout bus bar field 22. The shielding by metal-2-layer conductors 24 is completely blocking the coupling of the conductor lines 17 to the output conductor lines 18 in the metal-4-layer. The width of the metal-2 shielding conductors 24 is optimized to avoid this coupling and to be as thin as possible to minimize parasitic capacitance. The parasitic capacitances of conductor lines 17 are essentially the same for all columns and will therefore not produce a mismatch.

The above described architecture allows for designing an imager with high frame rates, high S/N ratio, high image quality, low power, using of the shelf IP components, in particular for the ADCs 7.

The invention claimed is
1. An image sensor circuit, comprising:
a pixel cell array having a plurality of pixel cells arranged along a plurality of column lines;
a plurality of readout circuits connected to said column lines, each of said readout circuits comprising an analog-to-digital converter, a plurality of parallel busbars, and a multiplexer for selectively connecting said busbars to said analog-to-digital converter;
wherein between two of said column lines which are connected to a first one of said readout circuits located at a first side of said pixel cell array, there is a column line which is connected to a second one of said readout circuits located at a second side of said pixel cell array opposite to said first side, wherein each of said busbars has a subset of said column lines associated to it by switches located at intersections of the busbars and of said associated column lines for selectively opening and closing an electrical connection between one of said column lines and one of said busbars, each of said busbars of a respective readout circuit extending across the same subset of said column lines, and no two adjacent column lines being associated to a same busbar, wherein the column lines and the busbars are arranged at two different layers in the image sensor circuit, and wherein the switches are located in a layer between busbars and column lines at intersections between the column lines and the busbars.

2. The image sensor of claim 1, wherein between any two column lines connected to two adjacent inputs of said first one of said readout circuits there is a column line connected to said second one of said readout circuits.

3. The image sensor of claim 1, wherein the number of busbars is n, and among any n adjacent inputs of one of said readout circuits, there is one connected to each of said n busbars.

4. The image sensor of claim 1, wherein each said column line extends across all of said plurality of parallel busbars of a corresponding readout circuit.

5. The image sensor of claim 1, wherein the readout circuit comprises a plurality of amplifiers having an input connected to an associated one of said plurality of parallel busbars, and a multiplexer having inputs connected to outputs of said amplifiers.

6. The image sensor of claim 5, wherein each said amplifier is connected to its associated busbar by a line extending across all of said plurality of parallel busbars of a corresponding readout circuit.

7. The image sensor of claim 5, wherein each said column line has associated to it two storage capacitors and a switch for selectively connecting one of said two capacitors to the column line, and each of said plurality of busbars comprises a first line for connecting to the first capacitor and a second line for connecting to the second capacitor.

8. The image sensor of claim 7, wherein the amplifiers are differential amplifiers having their inputs connected to the first and second lines of their associated busbar.

9. The image sensor of claim 1, wherein in said readout circuit at least part of each column line is formed of a planar conductor defining a first plane and is shielded by at least one grounded conductor which extends along said planar conductor in said first plane or in a second plane parallel to said first plane.

10. The image sensor of claim 1, wherein each busbar comprises a planar conductor defining a second plane and is shielded by at least one grounded conductor which extends along said planar conductor in said second plane or in a plane parallel to said second plane.

* * * * *